Figure 12:
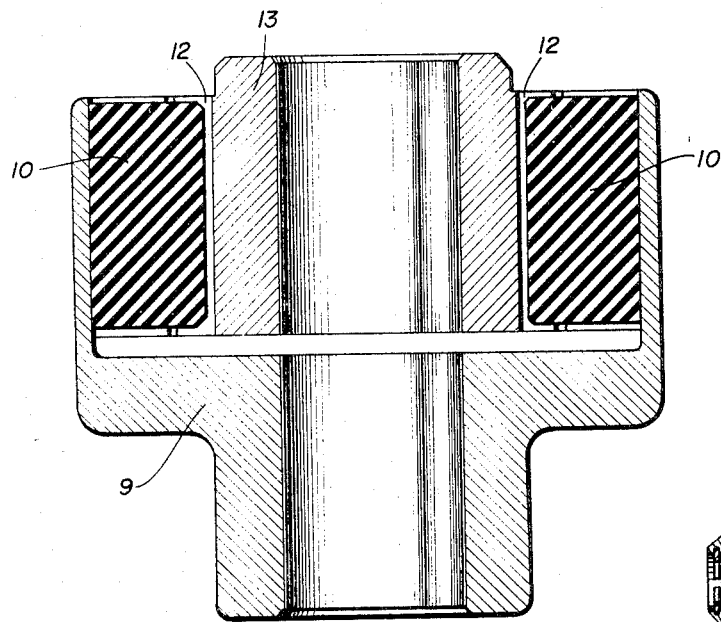

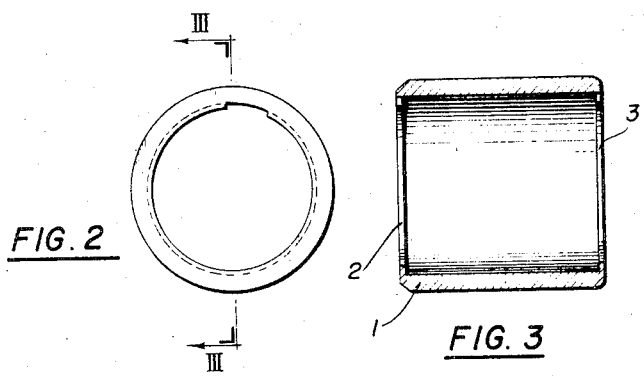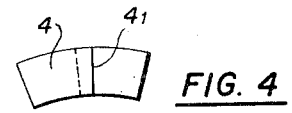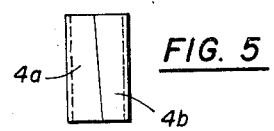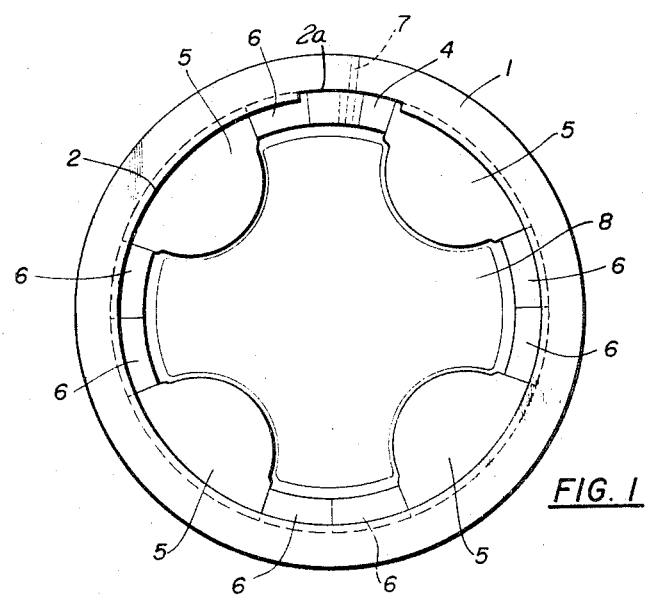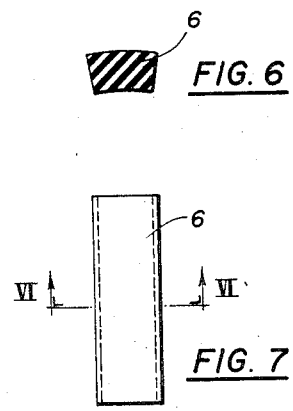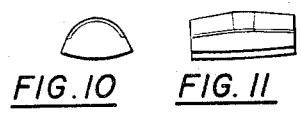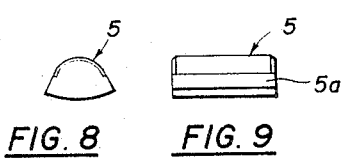

Aug. 2, 1966    R. JANSSEN ETAL    3,263,452
COUPLING

Filed June 15, 1964    2 Sheets-Sheet 2

RICHARD JANSSEN
THEODOR BURDELSKI
KURT VOIHS
        INVENTOR.

BY
*Aams S. Blodgett*

3,263,452
COUPLING

Richard Janssen, Theodor Burdelski, and Kurt Voihs, Dusseldorf, Germany, assignors to Ferroplast, Theo. Burdelski & Co., Dusseldorf, Germany, a corporation of Germany
Filed June 15, 1964, Ser. No. 375,050
Claims priority, application Germany, June 14, 1963, B 72,290
14 Claims. (Cl. 64—30)

This invention relates to a coupling and, more particularly, to apparatus arranged to connect rotatable shafts together for the transmission of torque therebetween.

Torque-transmitting couplings have been made in the past in many different designs and for many purposes. In all of these designs, certain essential basic problems must be solved. Generally speaking, these couplings have used torque-transmitting keys lying in grooves in the coupling housing. The formation of these grooves has resulted in a weak section in the housing and this has been a limiting factor in torque transmission. When large forces with corresponding high rates of revolution are encountered, the construction of couplings of this kind has been especially difficult. To eliminate these difficulties, designers have used tough alloy steels for the coupling housing which encloses the keys and they have also used light metal for the keys to reduce centrifugal force. However, despite the use of such special materials, the transmission of large forces at high rates of rotation dictated coupling dimensions that were quite large and the manufacture of such couplings was not only more expensive but also presented new problems in the technique of fabrication. These and other difficulties experienced with the prior art devices have been obviated in a novel manner by the present invention.

It is, therefore, an outstanding object of the invention to provide a coupling wherein the problem of small housing cross-section due to the formation of axial grooves has been eliminated.

Another object of this invention is the provision of a coupling capable of transmitting high torques at high rates of rotation but whose bulk is not unduly large.

A further object of the present invention is the provision of a coupling capable of high force transmission which is relatively inexpensive to manufacture.

It is another object of the instant invention to provide a coupling which is simple in construction, inexpensive to manufacture, and which is capable of a long life of useful service with a minimum of maintenance.

It is a further object of the invention to provide a coupling whose parts are readily replaceable in the event of damage or wear.

With these and other objects in view, as will be apparent to those skilled in the art, the invention resides in the combination of parts set forth in the specification and covered by the claims appended hereto.

Figure 14:
Figure 13:
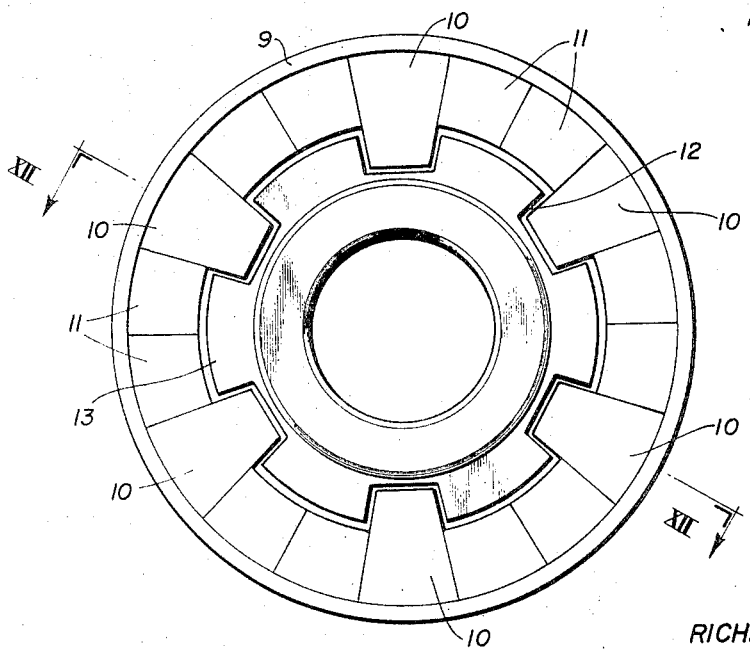

The character of the invention, however, may be best understood by reference to certain of its structural forms as illustrated by the accompanying drawings in which:

FIG. 1 is an end view of a coupling embodying the principles of the present invention, FIG. 2 is an end view of the outer housing of the coupling, FIG. 3 is a sectional view of the housing taken on the line III—III of FIG. 2, FIG. 4 is an end view of a locking element associated with the coupling, FIG. 5 is a top view of the locking element, FIG. 6 is a sectional view of a liner taken on the line VI—VI of FIG. 7, FIG. 7 is a plan view of the liner, FIG. 8 is an end view of a gripper, FIG. 9 is a side view of the gripper, FIG. 10 is an end view of a modified version of the gripper, FIG. 11 is a side view of the gripper shown in FIG. 10, FIG. 12 is a sectional view of an alternative form of coupling taken on the line XII—XII of FIG. 13, FIG. 13 is an end view of the coupling shown in FIG. 12, and FIG. 14 is a sectional view of an alternative form of a sleeve.

In general, the present invention removes the above-recited difficulties by suggesting the elimination from the very beginning of the problem of the weakening of the material by not providing grooves for keys. The invention includes grippers and liners resting on the inside of a cylindrical sleeve and tension means for creating a tangential tension which presses the grippers and liners against each other and against the inner surface of the sleeve where they are kept in their positions relative to one another. Furthermore, the invention suggests the creation of a tangential tension wherein several liners are located between grippers to act as tangential wedges, so that the tangential tension can be created by pushing these liners against the inner wall of the sleeve.

Referring first to FIG. 1, wherein are best shown the general features of the invention, it can be seen that the coupling consists of a tubular sleeve 1 and a shaft end 8. The shaft end has a cross-section in the form of a cross and is inserted within the sleeve 1; it will be understood, of course, that the shaft end could be a separate coupling member which would be bolted to a shaft. The sleeve 1 is provided at its ends with inwardly-directed annular flanges 2 and 3. One of the two flanges has a slot 2a formed at one location. Grippers 5 formed of an elastomer, such as butadiene, are arranged in pairs on the inside wall of the sleeve 1; these grippers are opposite one another and are always approximately the same distance from each other. Between each pair of grippers 5 are positioned two liners 6 also formed of elastomer material. In the area of the slot 2a provision is made for a tension means, such as a pressure member 4, which can be inserted through the slot 2a as the last element going into the inside of the sleeve as soon as the grippers 5 and the lining 6 are in position on the inside wall of the sleeve 1. As is shown in FIGS. 4 and 5, the pressure member 4 can be formed as two matching wedges 4a and 4b which together have the general shape of a rectangle in plan view. The surface of each gripper 5 is partially curved, but this curvature merges into flat surfaces 5a against which the corresponding side faces of the neighboring liners 6 lie. The front edges of the curved surface of the grippers 5 are lightly beveled, as can be seen from FIGS. 8 and 9 to permit easy insertion of the shaft end 8 into the sleeve between the grippers 5. The grippers can also be designed in a spherical form as shown in FIGS. 10 and 11.

In place of the flanges 2 and 3, it is possible to provide grooves in the surface of the sleeve into which snap rings may be inserted to serve the same purpose as shown in FIG. 1A.

Referring to FIGS. 12 and 13, it can be seen that the invention can also be formed in such a way that the special pressure member 4 can be omitted. By doing so, the coupling becomes even more simple and a specially designed tension wedge does not have to be provided. In this case, the tubular sleeve is designed as a socket 9 in which grippers 10 are arranged. Between these grippers are positioned liners 11. In order to lock the grippers 10 and the liners 11 against slipping in the socket within the range of the permissible load, these parts are made from an elastomer material, such as butadiene, and are pressed into the socket 9 in an elastically-deformed condition. The tangential forces resulting from the elastic deformation are so great that the grippers 10 and the liners 11 are pressed against the inside wall of the socket 9 and are not able to slip, whereupon special tension and securing elements are not necessary, as was true in the clutch shown in FIG. 1. A torque element 13 having notches 12 which mate with the grippers 10 and the liners 11 can be inserted into the sleeve and the clutch is ready for operation.

The operation and advantages of this invention will now be readily understood in view of the above description. Before the present invention, it was necessary to fabricate clutches with considerable expenditure of material and labor. In such a case, keys engaged with grooves which had to be milled into the cylindrical sleeve or housing of the coupling at considerable expense. In addition, this operation led to much weakening of the material cross-section. Because of the milling of the grooves for inserting the keys and, therefore, because of the weakening of the material cross-section, these old-type clutches had to be made very large, especially when high torsion moments were to be transmitted and when high speed was required. By using materials of high strength, the dimensions of the coupling could be kept small, but such materials have been considerably more expensive and they have made the machining much more difficult because of their greater toughness which makes for a more expensive machining operation.

In the present case, because of the omission of the milled grooves for the keys, the coupling constructed in accordance with the present invention requires only a simple thin-walled sleeve made from steel or other material, such as light metal. This sleeve can be fabricated by use of the simplest methods, since it requires only surface machining and there are no difficulties to be encountered by necessary heat treatments. Therefore, the manufacture of the cylindrical sleeve is very inexpensive, even though it may be made of high tensile-strength materials. In comparison with the previously known couplings and their sleeves, the material expenses and the machining and transportation costs are very small.

It is necessary to insert the grippers 5 and the liners 6 into the sleeve and in place of one of the liners 6 the pressure member 4 is driven through the slot 2a between the neighboring grippers 5 on one side and the liner 6 on the other side. By driving the member 4 inwardly, a tangential force is created which presses the grippers 5 and the liners 6 against the inside wall of the sleeve, thus obviating the danger of slippage. The pressure member 4 can be made from steel, metal, or plastic or made out of a combination of these materials and can be secured additionally by a screw 7, although this securing means is usually not needed because of the high tangential forces.

The insertion of the shaft 8 into the opening of the cylindrical sleeve 1 and the elements 4, 5, and 6 in place is very simple. The exchange of damaged or worn grippers or liners is also simple and presents no difficulty, this being accomplished by loosening the pressure member 4 at any given time.

One of the advantages of a coupling made in accordance with the invention (particularly the one shown in FIGS. 12 and 13) is that the clutch is secured against overload without having any intricate mechanism. In this case, the selection of the tangential forces brought about by the elastic deformation of the elements 10 and 11 take into account the fact the friction between the elements and the sleeve 9 must correspond to the maximum load permissible. In case the maximum load is exceeded, then a slippage movement is created between the grippers and the liners, on the one hand, and the sleeve, on the other hand, because there is no positive securing element built into the sleeve to prevent the turning of the grippers and liners.

It can be seen from an examination of these couplings that a number of special advantages arise as compared with the previously known couplings, especially in regard to the smaller fabricating costs, the lower weight, and the smaller dimensions. In spite of smaller dimension of the coupling, it is possible to transmit higher torque at higher speed. It also includes an additional security against an overload which could previously only have been obtained by use of special design elements. Finally, the individual parts of the clutch can be removed without any particular difficulty and in case of damage can be exchanged very easily.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A coupling consisting of a sleeve and a shaft lying within the sleeve with grippers between the sleeve and shaft which are movable in a direction parallel to the clutch axis and are exchangeable, distinguished by the fact that liners are arranged between the grippers and rest on the inside wall of the sleeve, with the assistance of tension devices creating tangential tension which press against each other and against the sleeve wall, and are retained in that position relative to each other.

2. A coupling as recited in claim 1, wherein the tangential tension is created by a liner which is formed as two tangential wedges.

3. A coupling as recited in claim 1, wherein the tangential tension is created by the elastic deformation of the liners and grippers to be brought into contact with the inside wall of the sleeve.

4. A coupling as recited in claim 3, wherein the cylindrical sleeve with the grippers and the liners is designed as a clutch socket to be slipped onto a torque element.

5. A coupling as recited in claim 4, wherein the cylindrical sleeve is equipped with annular flanges.

6. A coupling as recited in claim 5, wherein one of the annular flanges contains a slot for insertion of the liners and grippers.

7. A coupling as recited in claim 4, wherein the cylindrical sleeve contains annular grooves at the ends for the insertion of snap rings servings as securing elements in the axial direction.

8. A coupling as recited in claim 7, wherein the cylindrical sleeve is made up of a metal and the grippers and liners are formed of an elastomer.

9. A coupling as recited in claim 8, wherein the torque element of the clutch is provided with the grooves and the gripper to form parts of the element while located between them are individual liners which are pressed by axial and radial tension against the inside walls of the surrounding ring.

10. A coupling as recited in claim 9, wherein the tangential tension causes the pressure of the grippers and of the liners against the sleeve to correspond to the transmission of the maximum tortional rotation and no positive securing elements are provided between these parts and the sleeve.

11. A coupling, comprising
(a) a sleeve having on a cylindrical bore,
(b) a male element insertable in the bore and having axial recesses,
(c) an elastomer gripper in each recess engaging the surface of the bore,
(d) an elastomer liner between each pair of grippers engaging the surface of the bore,
(e) a pressure member acting between a gripper and a liner and pressing sideways against them to produce elastic deformation thereof.

12. A coupling as recited in claim 11, wherein the pressure member consists of a pair of cooperating wedge elements.

13. A coupling as recited in claim 11, wherein the pressure member consists of the last of the grippers and liners to be inserted.

14. A coupling as recited in claim 11, wherein an inwardly-directed flange is provided at each end of the bore and a slot is provided in one of the flanges, the slot providing for the insertion of the grippers, liners, and the pressure member.

References Cited by the Examiner

UNITED STATES PATENTS 2,160,445  5/1939  Spicer _____ 64—27

FOREIGN PATENTS 195,700  2/1958  Austria.
929,544  6/1955  Germany.

MILTON KAUFMAN, *Primary Examiner.*

HALL C. COE, *Examiner.*